(12) United States Patent (10) Patent No.: US 7,753,569 B2
Yamazaki et al. (45) Date of Patent: Jul. 13, 2010

(54) LAMP SYSTEM AND LAMP DEFLECTION CONTROL METHOD

(75) Inventors: Masashi Yamazaki, Shizuoka (JP); Manabu Sasa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/196,338

(22) Filed: Aug. 22, 2008

(65) Prior Publication Data

US 2009/0059608 A1 Mar. 5, 2009

(30) Foreign Application Priority Data

Aug. 27, 2007 (JP) ............................. 2007-219491

(51) Int. Cl.
*B60Q 1/12* (2006.01)
(52) U.S. Cl. .................... 362/466; 362/465; 362/467
(58) Field of Classification Search ................ 362/464, 362/465, 466, 467; 701/49
See application file for complete search history.

(56) References Cited

U.S. PATENT DOCUMENTS

| | | | |
|---|---|---|---|
| 6,049,749 A * | 4/2000 | Kobayashi | 701/49 |
| 7,036,963 B2 * | 5/2006 | Fukawa | 362/465 |
| 7,234,849 B2 * | 6/2007 | Hori et al. | 362/466 |
| 7,239,951 B2 * | 7/2007 | Sugimoto et al. | 701/49 |

FOREIGN PATENT DOCUMENTS

| | | |
|---|---|---|
| EP | 1195293 A2 | 4/2002 |
| EP | 1375250 A2 | 1/2004 |
| EP | 1705061 A2 | 9/2006 |
| JP | 2004-268900 A | 9/2004 |
| JP | 2004-322683 A | 11/2004 |
| JP | 2005-112296 A | 4/2005 |
| WO | 2004/080758 A2 | 9/2004 |

OTHER PUBLICATIONS

Extended European Search Report dated Aug. 13, 2009.

* cited by examiner

*Primary Examiner*—Thomas M Sember
(74) *Attorney, Agent, or Firm*—Sughrue Mion, PLLC

(57) ABSTRACT

A lamp system is provided. The lamp system includes a deflection angle calculating section configured to calculate a deflection angle of an irradiation direction of a lamp based on a steering angle of a steering wheel of a vehicle and a speed of the vehicle, a swivel control section configured to control the irradiation direction in accordance with the calculated deflection angle, a filter section configured to change an output response of a change of the speed of the vehicle to be input to the deflection angle calculating section, and a filter control section configured to compare the calculated deflection angle with a reference value and to control the filter section to change the output response in accordance with a result of the comparison.

9 Claims, 4 Drawing Sheets

LAMP SYSTEM AND LAMP DEFLECTION CONTROL METHOD

FIELD OF THE INVENTION

Systems and method consistent with the present invention relate to lamps and, more particularly, to headlamps of vehicles and to control of lamp deflection according to changes in a steering angle of the vehicle.

DESCRIPTION OF THE RELATED ART

Adaptive Front lighting System (AFS) lamp systems have been proposed to control the irradiating direction of headlamps in right and left directions so as to follow a steering angle of a steering wheel, thereby enhancing safety in driving a vehicle. According to this system, in addition to the straight-ahead direction, the irradiating direction of the headlamps can be changed to a direction in which the driver steers the vehicle, that is, a direction in which the driver intends to drive the vehicle, and in this respect, this lamp system is effective in enhancing safety in driving the vehicle.

In addition, in recent years, an AFS-applied lamp system has been proposed in which not only a steering angle but also a vehicle speed is detected, so that the irradiating direction of the headlamps is made to match accurately the conditions in which a vehicle is running by controlling the deflection of the irradiating direction of the headlamps based on the vehicle speed and steering angle which were detected (see, e.g., JP 2004-322683 A).

In the related art AFS in which vehicle speeds are taken into consideration, however, although the steering angle remains constant, in the event that the vehicle speed changes, the irradiating direction of the headlamps is changed, and the irradiating direction becomes unmatched to the actual running conditions of the vehicle, causing physical disorder to the driver and creating an unsafe driving condition. For example, when the driver slows the vehicle towards an intersection to turn left or right, then turns the steering wheel to cause the vehicle to turn left or right while entering the intersection and attempts to accelerate the vehicle while cornering, the AFS, which detects the acceleration, then determines that the driver's viewpoint has changed and erroneously changes the irradiating direction of the headlamps. In addition, there may occur an occasion when the forward surface lying ahead in the traveling direction of the vehicle cannot be illuminated sufficiently, which causes an unsafe driving condition.

To address the above-described issues with the AFS, there has been proposed a technique to subject a detected steering angle to a filtering operation (see, e.g., JP 2004-268900 A). In the related art system, by the detected steering angle, or by detecting the steering angle after a filtering operation is performed, it is possible to control a following response when the irradiating direction of headlamps changes to follow the steering angle so as to prevent the driver to feel the sensation of physical disorder.

In addition, there is proposed another related art system in which filtering of a high frequency component is applied to decrease the following response when the vehicle is running straight ahead, and in which filtering of a low frequency component is applied to increase the following response when the vehicle is turning, in order to prevent the driver from feeling a sensation of physical disorder and to prevent the occurrence of unsteadiness in the irradiating direction of the headlamps while the vehicle is running straight ahead (see, e.g., JP 2005-112296 A).

However, the related art has a number of disadvantages. For example, in a case in which a related art AFS is built which takes a change of a vehicle speed into consideration in determining the following response of the irradiating direction, when only the vehicle speed changes while the steering angle remains the same, the irradiating direction of the headlamps is deflected. The causes the driver to be disoriented and decreases the driving safety.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

It is an aspect of the present invention to provide a lamp system and a lamp deflection control method which can realize illumination which does not cause the driver to feel disoriented when the deflection of the irradiating direction of the lamps is controlled based on a change in vehicle speed of the vehicle, and which increases driving safety.

According to an illustrative aspect of the present invention, a lamp system is provided. The lamp system includes a deflection angle calculating section configured to calculate a deflection angle of an irradiation direction of a lamp based on a steering angle of a steering wheel of a vehicle and a speed of the vehicle, a swivel control section configured to control the irradiation direction in accordance with the calculated deflection angle, a filter section configured to change an output response of a change of the speed of the vehicle to be input to the deflection angle calculating section, and a filter control section configured to compare the calculated deflection angle with a reference value and to control the filter section to change the output response in accordance with a result of the comparison.

According to another illustrative aspect of the present invention, a method of controlling a deflection of an irradiating direction of a lamp is provided. The method includes detecting a steering angle of a steering angle of a vehicle and a speed of the vehicle, calculating a deflection angle of the irradiating direction of the lamp based on the steering angle and the speed of the vehicle, controlling the deflection of the irradiating direction in accordance with the calculated deflection angle, comparing the calculated deflection angle with a reference value, and controlling, in accordance with a result of the comparing, an output response of a change of the speed of the vehicle speed to be used in the calculating.

Other illustrative aspects and advantages of the invention will be apparent from the following description, the drawings and the claims.

DETAILED DESCRIPTION OF EXEMPLARY EMBODIMENTS OF THE PRESENT INVENTION

Hereinafter, exemplary embodiments of the invention will be explained with reference to the drawings. The following exemplary embodiments do not limit the scope of the invention.

First Exemplary Embodiment

Figure 1:
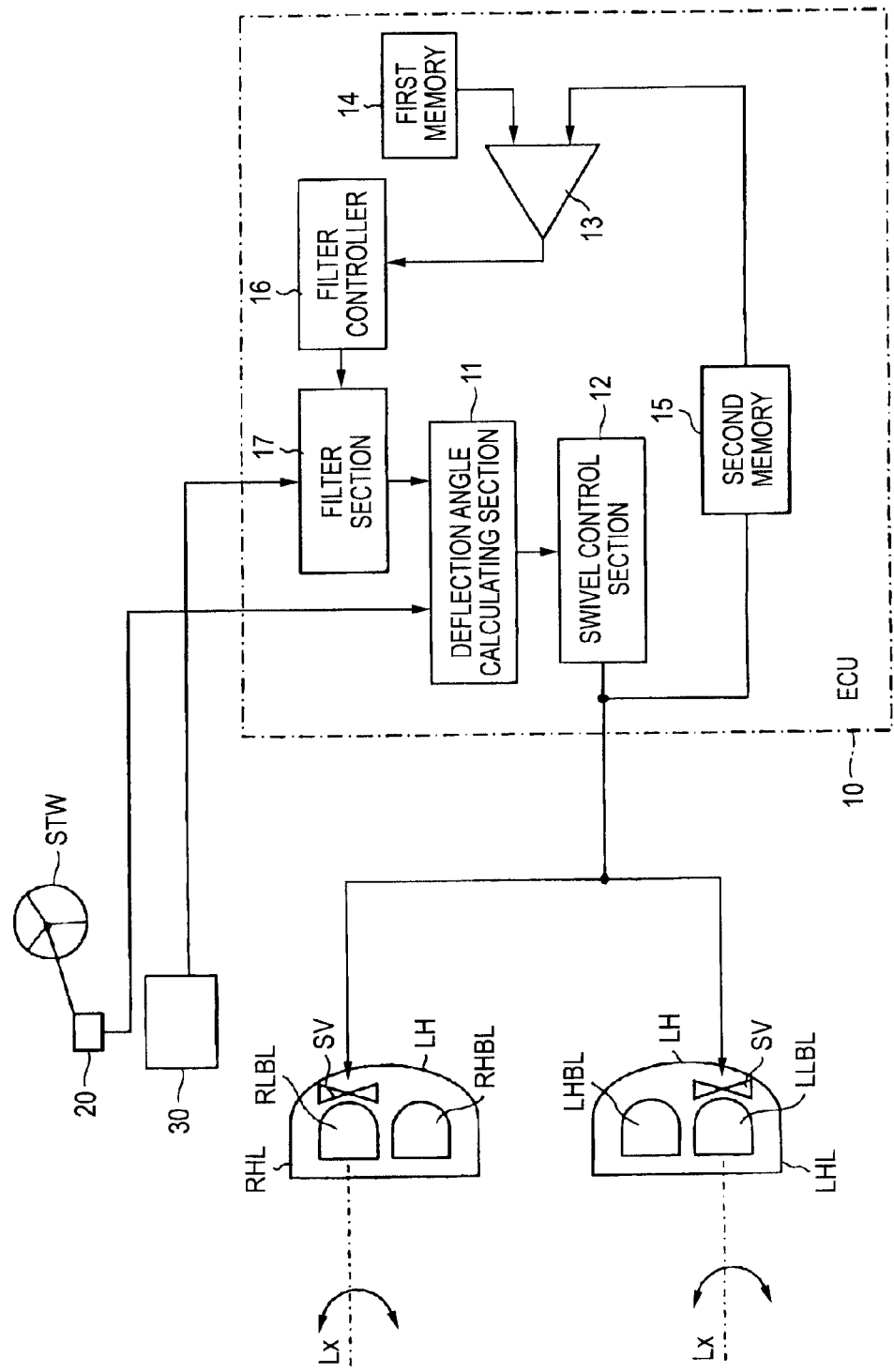
FIG. 1 is block diagram of a lamp system according to a first exemplary embodiment of the invention.

FIG. 1 is a diagram of a lamp system according to a first exemplary embodiment. This lamp system is applicable to right and left-side headlamps of a vehicle. The vehicle may be, for example, an automobile, or any vehicle which uses a headlamp to light the vehicle's path. In the first exemplary embodiment, a right-side headlamp RHL and a left-side headlamp LHL have basically the same configuration. Each of the headlamps RHL, LHL includes a lamp housing LH having an opening covered by a transparent cover, a low-beam lamp RLBL, LLBL having a projector-type lamp unit for irradiating a low-beam light distribution pattern, and a high-beam lamp RHBL, LHBL having a lamp unit for irradiating a high-beam light distribution pattern. The low-beam lamp RLBL, LLBL and the high-beam lamp RHBL, LHBL are accommodated in the respective lamp housings LH. Each of the low-beam lamps RLBL, LLBL are configured such that a deflection of an irradiating direction Lx thereof can be controlled in horizontal directions, i.e., in right and left directions, with a swivel mechanism SV. Because such a swivel mechanism SV is known, a detailed description thereof will be omitted.

Each of the swivel mechanisms SV of the headlamps RHL, LHL are coupled to an Electronic Control Unit (ECU) 10, and right and left deflections of the headlamps RHL, LHL are controlled by the ECU 10. A steering angle sensor 20 configured to detect a steering angle of a steering wheel STW, and a vehicle speed sensor 30 configured to detect a vehicle speed are coupled to the ECU 10, and the ECU 10 controls the swivel mechanisms SV based on a steering angle signal from the steering angle sensor 20 and a vehicle speed signal from the vehicle speed sensor 30 so as to control the respective irradiating directions Lx of the low-beam lamps RLBL, LLBL.

The ECU 10 includes a deflection angle calculating section 11 which is configured to calculate a deflection angle of an irradiating direction Lx of each of the low-beam lamps RLBL, LLBL, i.e., an angle of the irradiating direction Lx of each of the low-beam lamps RLBL, LLBL with respect to a straight ahead traveling direction of the vehicle, based on a steering angle signal from a steering angle sensor 20 and the vehicle speed signal from the vehicle speed sensor 30. The ECU 10 also includes a swivel control section 12 which is configured to output a swivel control signal to control the swivel mechanisms SV based on a deflection angle signal indicating the deflection angle calculated by the deflection angle calculating section 11. This swivel control signal is input into the swivel mechanisms SV of the respective headlamps RHL, LHL. Control is executed such that the irradiating direction Lx of each of the low-beam lamps RLBL, LLBL inside the respective headlamps RHL, LHL is directed towards a direction of the calculated deflection angle.

The ECU 10 further includes a comparing section 13 which is configured to compare a swivel control amount (i.e., the deflection angle or a swivel angle), which is information carried by the swivel control signal output from the swivel control section 12, with a reference swivel control amount (a reference value) stored in a first memory 14. A second memory 15, which is coupled to an input terminal of the comparing section 13, is configured to temporarily store the swivel control amount output from the swivel control section 12. The comparing section 13 compares the swivel control amount stored in the second memory 15 with the reference value stored in the first memory 14. An output of the comparing section 13 is input into a filter controller 16 so as to control a switching of a switch SW of a filter section 17, which will be described later. A filter control section according of the first exemplary embodiment includes the comparing section 13, the first memory 14, the second memory 15 and the filter controller 16.

The ECU 10 also includes the filter section 17 which changes an output response based on a change of the vehicle speed (a vehicle speed value) which is information on the vehicle speed signal from the vehicle speed sensor 30. The output response of the change of the vehicle speed is an inclination angle of a vehicle speed change (a rate of change) of a vehicle speed output from the filter section 17 in vehicle speed to time coordinates. That is, decreasing an output response of the change of the vehicle speed denotes setting the inclination angle to a value that is smaller than an inclination angle of an input, whereas increasing the output response denotes setting the inclination angle to be greater than or equal to the inclination angle of the input. This filter section 17 is controlled by the filter controller 16 based on a result of the comparison at the comparing section 13. In the first exemplary embodiment, a vehicle speed is input to the filter section 17. The vehicle speed is also input to the deflection angle calculating section 11 along with the output response of the filter section 17.

Figure 2A:
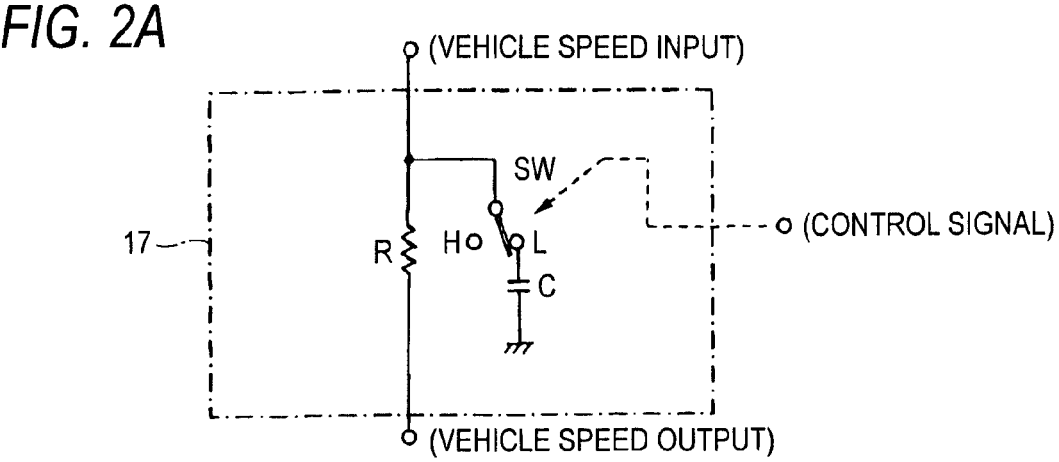
FIG. 2A is a circuit diagram of a filter section of the lamp system according to the first exemplary embodiment of the present invention.

As is shown in FIG. 2A, the filter section 17 is configured as a low-pass filter. More specifically, the filter section 17 is a CR circuit including a resistor R coupled in series between input and output, and a capacitor C coupled to the resistor R via a switch SW. The switch SW is configured to be turned on or off by a control signal from the filter controller 16 such that when switched to an H side, a vehicle speed signal is output as it is without coupling the capacitor C to the resistor R, whereas when switched to an L side, the resistor R is coupled to the capacitor C to output a vehicle speed signal in a delayed manner. The delay time is determined by a time constant of the CR circuit, whereby when switched to the H side, a vehicle speed is output to the deflection angle calculating section 11 without the rate of change of the vehicle speed being suppressed, whereas when switched to the L side, a vehicle speed is output to the deflection angle calculating section 11 with the rate of change of the vehicle speed being suppressed. Alternatively, the filter section 17 may be configured with software.

Figure 3:
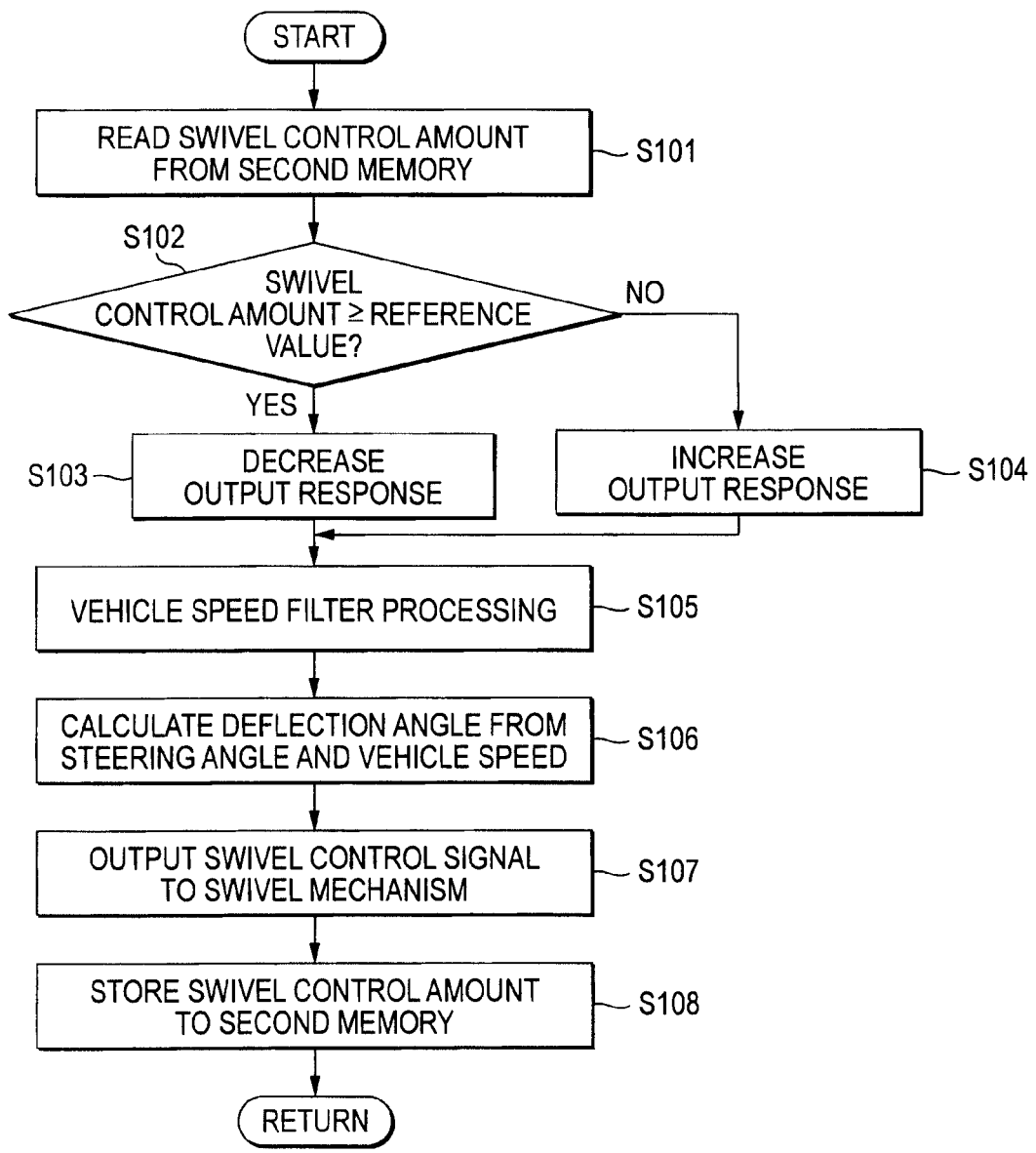
FIG. 3 is a flowchart of an operation of the lamp system of FIG. 1.

A controlling operation of the irradiating direction of the headlamps according to the headlamp system configured as described above will be described below. As shown in a flowchart of FIG. 3, the ECU 10 reads out the swivel control amount stored in the second memory 15 (S101). The comparing section 13 compares the swivel control amount with the reference value stored in the first memory 14, and determines whether the swivel control amount is greater than or equal to the reference value (S102). The output response of the filter section 17 is set by the filter controller 16 based on a result of the comparison. Namely, if it is determined that the swivel control amount is greater than or equal to the reference value (S102: YES), which corresponds to a case, for example, in which the vehicle is cornering, the filter controller 16 switches the switch SW of the filter section 17 to the L side so as to decrease the output response of the vehicle speed (S103). On the other hand, if it is determined that the swivel control amount is smaller than the reference value (S102: NO), which corresponds to a case, for example, in which the vehicle is traveling straight ahead, the filter controller 16 switches the switch SW of the filter section 17 to the H side so as to set the output response thereof by outputting a vehicle speed equal to the input (S104). In the event that no swivel control amount is stored in the second memory 15, "0" is set as a default value, which is a value smaller than the reference value stored in the first memory 14, and in the filter section 17, the output response of the vehicle speed is accordingly set equal to the input.

Next, the ECU 10 obtains the steering angle signal from the steering angle sensor 20 and the vehicle speed signal from the vehicle speed sensor 30 and inputs the steering angle signal and the vehicle speed signal to the deflection angle calculating section 11. The vehicle speed signal that is input to the deflection angle calculating section 11 is filtered by the filter section 17. Namely, the vehicle speed signal is made into a vehicle speed signal in which the output response of the vehicle speed is decreased or a vehicle speed signal in which the output response of the vehicle speed is set equal to input based on a result of the comparison carried out in step S102 (S105). Then, the deflection angle calculating section 11 calculates an appropriate deflection angle (a swivel angle) of the irradiating direction Lx of the headlamps corresponding to a steering angle of the vehicle based on the steering angle and the vehicle speed signal, and outputs the calculated deflection angle to the swivel control section 12 (S106). The swivel control section 12 generates a swivel control signal in which a swivel control amount is set to deflect the low-beam lamps RLBL, LLBL to a direction indicated by the deflection angle based on the deflection angle input thereinto, and outputs the generated swivel control signal to the swivel mechanisms SV (S107). This allows the swivel mechanisms SV to control the deflection of the respective low-beam lamps RLBL, LLBL based on the swivel control signal so as to control the irradiating direction Lx of the respective low-beam headlamps to be deflected to a direction suitable for the running conditions of the vehicle.

In addition to the above the swivel control section 12 stores the set swivel control amount in the second memory 15 (S107). Consequently, when the flow of operations described above is repeated in the next cycle, the swivel control amount stored in the second memory 15 in the present cycle will be read out for comparison with the reference value in the comparing section 13. Namely, the swivel control amount set in the previous or last cycle is compared with the reference value in the following cycle, and the filter controller 16 sets a suppression value of the filter section 17 based on a result of the comparison and outputs a vehicle speed signal whose rate of change is suppressed based on the suppression value to the deflection angle calculating part 11, where a deflection angle is calculated together with a steering angle.

According to the configuration described above, when the swivel control amount stored in the second memory 15 is greater than or equal to the reference value stored in the first memory 14, that is, when a deflection angle of the irradiating direction of the low-beam lamps RLBL, LLBL is greater than or equal to a reference deflection angle, which corresponds to a case, for example, in which the vehicle is in such a state that the vehicle is being steered at a large angle, the filter section 17 sends the vehicle speed to the deflection angle calculation means 11 with the output response thereof being lowered. Accordingly, in the deflection angle calculating section 11, a change in deflection angle relative to the actual change in vehicle speed becomes small and the change in swivel control amount is suppressed. Consequently, even if the vehicle speed changes, the change in irradiating direction of the low-beam lamps RLBL, LLBL is little, whereby even when the vehicle is slowed or decelerated in an intersection while being steered, there does not occur such an occasion that the AFS determines from the deceleration that the driver's viewpoint has changed and then changes the irradiating direction of the low-beam lamps RLBL, LLBL without the driver performing a steering operation. Thus, the driver is prevented from being disoriented and safety is maintained. In addition, there does not occur such an occasion that the irradiating direction of the low-beam lamps RLBL, LLBL is deflected largely from the direction in which the vehicle is steered, and hence, the surface lying ahead in the traveling direction of the subject vehicle can be illuminated sufficiently.

Figure 4:
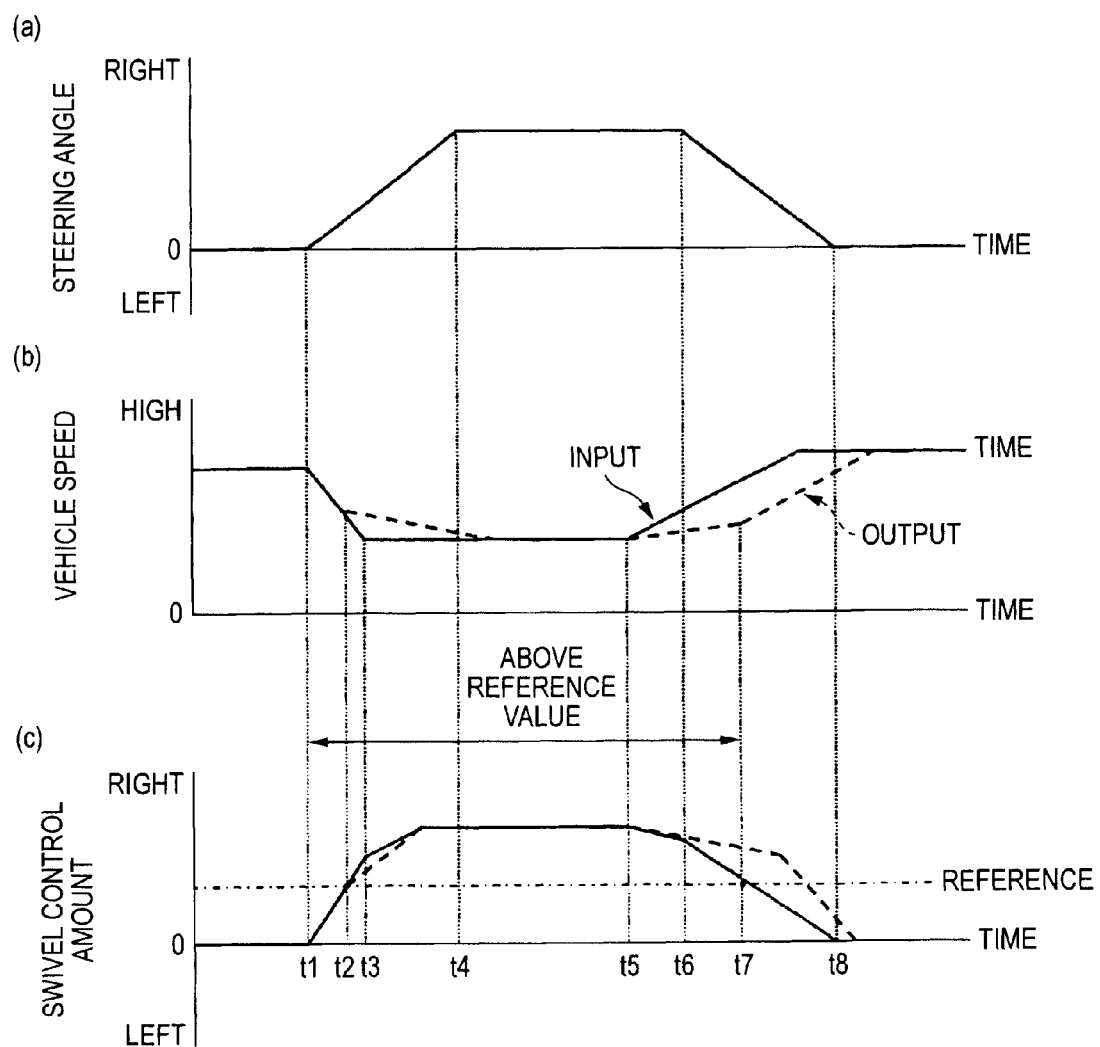
FIG. 4 is a timing chart of the operation of the lamp system of FIG. 1.

On the other hand, when the swivel control amount that is stored in the second memory 15 is smaller than the reference value stored in the first memory 14, that is, the deflection angle of the irradiating direction of the low-beam lamps RLBL, LLBL is smaller than the reference deflection angle, which corresponds to a case, for example, in which the subject vehicle is in such a state that the vehicle is being steered at a small angle as when the subject vehicle is steered to change lanes, no substantial filter processing by the filter section 17 is performed. Since the output response of the vehicle speed is set equal to input, in the deflection angle calculating section 11, the deflection angle is changed in accordance with the actual change in vehicle speed and changes the swivel control amount. Consequently, the irradiating direction of the low-beam lamps RLBL, LLBL is changed in such a manner as to follow the change in vehicle speed. Then, determining that the driver's viewpoint has changed, the AFS changes the irradiating direction of the low-beam lamps RLBL, LLBL, whereby the driver is prevented from being disoriented. In addition, by this action of the AFS, the surface lying ahead in the traveling direction of the vehicle can be illuminated sufficiently, which increases driving safety By taking as an example an occasion when the vehicle is turning right, the operations described above will be described based on timing examples shown in FIG. 4. FIG. 4 is a timing chart showing the timing of the steering angle, the vehicle speed, and the deflection angle (swivel control amount) of the low beams. When the vehicle enters an intersection to turn right or left, the vehicle is slowed and started to be steered at a point in time t1 and the steering angle continues to increase. When the vehicle starts cornering, the vehicle speed becomes constant at a point in time t3 and at a point in time t4, the steering angle becomes maximum, the vehicle continuing the constant speed running in that state. When the vehicle passes through an intermediate point of cornering, the vehicle starts to be accelerated at a point in time t5, the steering wheel is started to be returned at a point in time t6, and the vehicle returns to the straight ahead traveling direction at a point in time t8.

In this series of operations, in the related art techniques, the system detects the increase in vehicle speed or the acceleration of the vehicle at the point in time t5 and controls the steering angle or the steering wheel to return to the straight ahead traveling direction as indicated by a solid line of the swivel control amount chart in accordance with the change in vehicle speed due to the acceleration. According to the series of operation of the related art technique, although this returning speed depends on the degree of acceleration, the vehicle is still in the midst of cornering in the time interval between the points in time t5 and t6, and irrespective of the fact that the driver has not returned the steering wheel yet, the operation is started of returning the irradiating direction of the lamps to the straight ahead traveling direction of the vehicle due to the acceleration of the vehicle or increase in vehicle speed, whereby the road surface lying ahead of the vehicle which is now turning right cannot be illuminated any more.

In contrast to the related art technique, in the first exemplary embodiment, even in the midst of cornering, when the swivel control amount exceeds the reference value at a point in time t2, the output response of the vehicle speed in the filter section 17 is set low, and the vehicle speed that is input to the deflection angle calculating section 11 is started to be delayed from the point in time t2 as indicated by a broken line in the vehicle speed chart due to the setting, and the vehicle speed is put in such a state that the deceleration is relaxed. Because of this, a deflection angle that is calculated by the deflection angle calculating section 11 and a swivel control amount that is obtained from the deflection angle are made to exhibit moderately increasing characteristics as is indicated by a broken line in the swivel control amount chart by the vehicle speed in which the deceleration is relaxed, whereby a drastic change in irradiating direction is prevented. Next, as is shown in the vehicle speed chart, although the vehicle starts to be accelerated or the vehicle speed starts to be increased at a point in time t5, since the swivel control amount still remains greater than or equal to the reference value, the increase in vehicle speed due to the acceleration is delayed until a point in time t7 where the response to a change in vehicle speed is set low, and thereafter, the vehicle speed is input to the deflection angle calculating section 11 as a normal increased vehicle speed resulting from the acceleration. Accordingly, the control of directing the irradiating direction towards the straight ahead traveling direction by the swivel control amount is suppressed from the points in time t5 to t7. Consequently, even though the vehicle is accelerated in the midst of cornering, the irradiating direction is kept directed in the direction in which the vehicle turns right, whereby the surface lying ahead in the traveling direction of the vehicle is kept illuminated. This prevents the driver from being disoriented, and at the same time, increases driving safety.

In the first exemplary embodiment, while the filter control of the filter section 17 is disabled when the swivel control amount is smaller than the reference value so that the output response of the vehicle speed is made equal to input, a configuration may be adopted in which a filter control is implemented by the filter section 17 with the output response set higher than that resulting when the swivel control amount is greater than or equal to the reference value but slightly lower than that of the input. By adopting this configuration, a drastic and large change in irradiating direction of the lamps can be prevented which would otherwise be caused in association with a change in vehicle speed when the swivel control amount exceeds the reference value or becomes smaller than the reference value. Accordingly, the occurrence of a phenomenon can be suppressed in which the irradiating direction of the lamps becomes unstable when the swivel control amount changes round the reference value.

Second Exemplary Embodiment

In the first exemplary embodiment, the output response of the filter section 17 in outputting the vehicle speed is controlled based on the relationship between the swivel control amount and the reference value. However, according to a second exemplary embodiment, a configuration may be adopted in which a difference between the swivel control amount and the reference value is obtained and the output response of the filter section may be controlled to a plurality of different values.

Figure 2B:
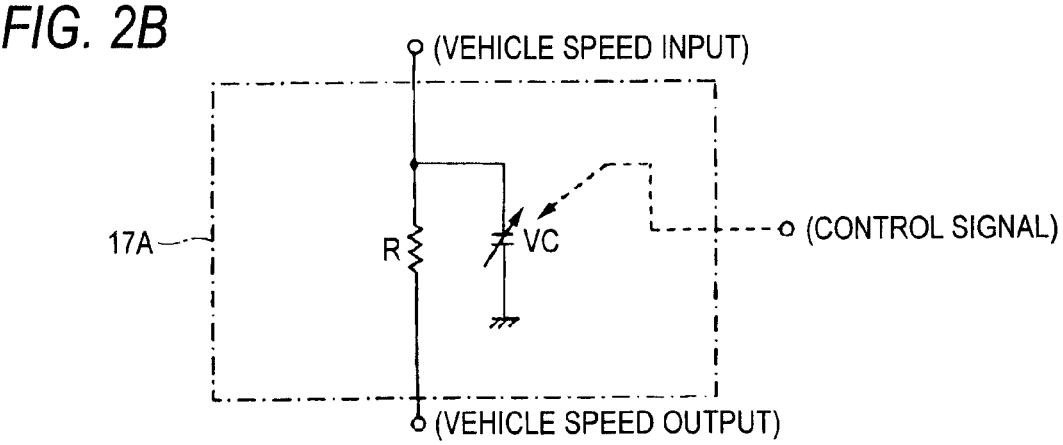
FIG. 2B is a circuit diagram of a filter section according to a second exemplary embodiment of the present invention.

FIG. 2B is a block diagram of a filter section 17A of the lamp system according to a second exemplary embodiment. The filter section 17A comprises a variable capacitor VC, and a delay time in the CR circuit is made to change by controlling the variable capacitor VC using the filter controller 16, so as to change the output response of the filter section 17A in outputting a vehicle speed to the deflection angle calculating section 11. In addition, as a configuration for controlling continuously the change in capacity of the variable capacitor VC of the filter section 17A, the comparing section 13 shown in FIG. 1 is may be configured as a subtracter for calculating a difference between the swivel control amount stored in the second memory 15 and the reference value stored in the first memory 14.

Figure 2C:
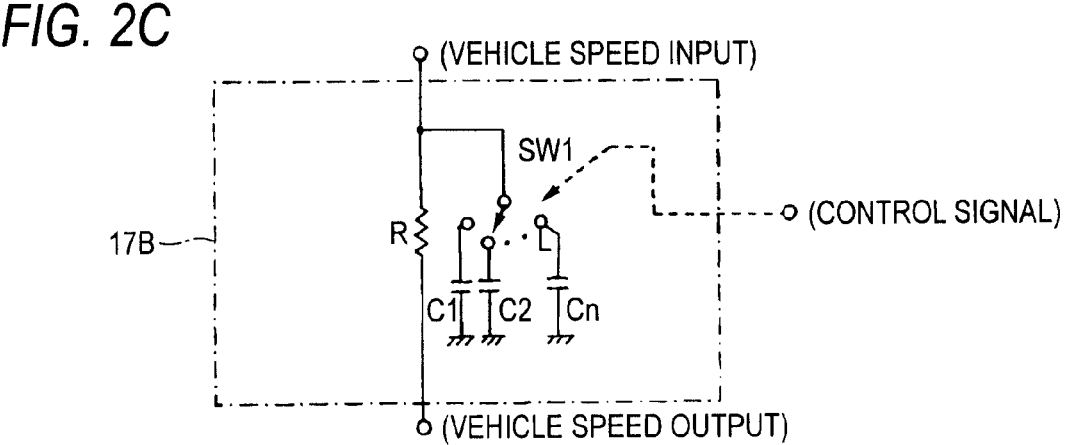
FIG. 2C is a circuit diagram of a filter section according to a third exemplary embodiment of the present invention.

Alternatively, as shown in FIG. 2C, a configuration of the lamp system may be adopted in which a filter section 17B comprises a plurality of capacitors C1 to Cn and a switch SW which can switched stepwise among the plurality of capacitor according to control of the filter controller 16. Thus, the time constant is made to change by switching the switch SW so as to change the output response of the filter section 17B in outputting a vehicle speed to the deflection angle calculating section 11. In this case, the comparing section 13 changes the position of the switch SW based on a difference between the swivel control amount and the reference value.

In the second exemplary embodiment, since the value of the output response of the vehicle speed is controlled according to a plurality of different values continuously or in a stepwise manner in accordance with the value of the swivel control amount, the output response of the vehicle speed can be controlled more precisely in accordance with various running conditions of the vehicle. In particular, in the case of the first exemplary embodiment in which the output response of the vehicle speed is controlled in a two-valued fashion by determining whether the swivel control amount is greater or less than the reference value, the swivel control amount is made to change widely across the reference value, and this may cause an occasion when the irradiating direction of the lamps is changed drastically. In the second exemplary embodiment, however, such a drastic change in irradiating direction of the lamps is prevented.

While in the exemplary embodiments described above, the ECU 10 obtains a steering angle and a vehicle speed cyclically so as to obtain a swivel control value for execution of the swivel control, the cycle in which steering angles and vehicle speeds are captured by the ECU 10 may be controlled by the timing of a clock, provided either externally or from the ECU 10. Alternatively, such a cyclic control may not be implemented, provided that a so-called feedback control can be executed.

The filter section of the invention is not limited to the configurations of the exemplary embodiments, provided that the vehicle speed, that is, the output response of the vehicle speed can be controlled, and hence, as has been described above, the filter section may be made up as a software filter in which signal processing is carried out by software. Alternatively, the filter section may comprise active components, such as transistors and the like.

While description has been made in connection with exemplary embodiments of the present invention, those skilled in the art will understand that various changes and modification may be made therein without departing from the present invention. It is aimed, therefore, to cover in the appended claims all such changes and modifications falling within the true spirit and scope of the present invention.

What is claimed is:

1. A lamp system comprising:
   a filter section which receives a vehicle speed signal as an input;
   a deflection angle calculating section which is configured to calculate a deflection angle of an irradiation direction of a lamp based on a steering angle of a steering wheel of a vehicle and an output of the filter section;
   a swivel control section which is configured to control the irradiation direction in accordance with the deflection angle; and
   a filter control section which is configured to compare the deflection angle with a reference value and to control the filter section,
   wherein the filter section filters the vehicle speed signal and sends a filtered vehicle speed signal as the output, and
   the filter control section controls the filter section to change, in accordance with a result of the comparison, an output response of the filter section with respect to a change of the vehicle speed signal input to the filter section.

2. The lamp system according to claim 1, wherein the filter control section is configured to control the filter section to decrease the output response if the calculated deflection angle is greater than or equal to the reference value.

3. The lamp system according to claim 2, wherein, if the deflection angle is less than the reference value, the filter control section is configured to control the filter section such that the output response is higher than the output response resulting when the calculated deflection angle is greater than or equal to the reference value.

4. The lamp system according to claim 1, wherein the filter control section is configured to control the filter section to change the output response continuously so as to follow a difference between the deflection angle and the reference value.

5. The lamp system according to claim 1, wherein the filter control section is configured to control the filter section to change the output response in a stepwise manner so as to follow a difference between the deflection angle and the reference value.

6. The lamp system according to claim 1, further comprising:
   a steering angle sensor which is configured to detect the steering angle and to send a steering angle signal to the deflection angle calculating section; and
   a vehicle speed sensor which is configured to detect a speed of the vehicle and to send the vehicle speed signal to the filter section.

7. A method of controlling a deflection of an irradiating direction of a lamp, the method comprising:
   detecting a steering angle of a vehicle and a speed of the vehicle to produce a steering angle signal and a vehicle speed signal;
   filtering the vehicle speed signal through a filter section to output a filtered vehicle speed signal;
   calculating a deflection angle of the irradiating direction of the lamp based on the steering angle signal and the filtered vehicle speed signal;
   controlling the deflection of the irradiating direction in accordance with the deflection angle;
   comparing the deflection angle with a reference value; and
   changing, in accordance with a result of the comparing, an output response of the filter section with respect to a change of the vehicle speed signal.

8. The method according to claim 7, wherein the controlling the output response comprises decreasing the output response if the deflection angle is greater than or equal to the reference value.

9. The method according to claim 8, wherein the controlling the output response comprises setting, if the deflection angle is less than the reference value, the output response such that the output response is higher than the output response resulting when the calculated deflection angle is greater than or equal to the reference value.

* * * * *